Patented Sept. 27, 1932

1,879,435

UNITED STATES PATENT OFFICE

BEVERLY OBER AND EDWARD HYATT WIGHT, OF BALTIMORE, MARYLAND, ASSIGNORS, BY MESNE ASSIGNMENTS, TO THE OBERPHOS COMPANY, OF BALTIMORE, MARYLAND, A CORPORATION OF MARYLAND

PROCESS FOR MANUFACTURING PHOSPHATIC FERTILIZERS

No Drawing.   Application filed September 23, 1929.   Serial No. 394,729.

This invention relates to an improved process of manufacturing phosphatic fertilizers and is a continuation in part of applications Serial No. 304,789, filed September 8, 1928 and Serial No. 393,826, filed September 19, 1929.

The usual method of preparing phosphatic fertilizers comprises admitting a predetermined quantity of sulphuric acid and ground phosphate rock to a mixing pan, mixing the two ingredients for a relatively short period of time and then depositing the mixed material in a den. The function of the mixing apparatus is to obtain as great a dispersion of the two reaction ingredients as is possible. However this operation is of relatively short duration and incomplete because of the fact that the rock and acid react very quickly to form solid products. These solid products increase the viscosity of the mass and the latter finally assumes a substantially semi-solid state. Before this state is reached the material is deposited in a den.

As a result of the incomplete mixing period, high acidulations cannot be obtained and the final product contains some unconsumed or free acid. Various methods have been proposed to eliminate the free acid, among which is the treatment of the fertilizer product with ammonia so as to form ammonia salts of a fertilizing value.

It is an object of the present invention to provide a novel method of manufacturing phosphatic fertilizer wherein a reaction chamber or den may be charged in a novel manner to insure not only a thorough mixture of the reaction ingredients, but also to prepare a quantative mixture.

Another object of the invention is to provide a process by which the receiving stage may be charged with a substantially completely mixed homogeneous mass of phosphatic material and reagent.

Still another object is to provide a process for preparing phosphatic fertilizer whereby the reactions are accelerated in a high degree by providing optimum reactive conditions.

A further object is to provide a process in which the phosphatic raw material is treated in a novel manner to insure an improved final product.

A still further object is to provide a process wherein the energy of moving bodies of materials is utilized to effect a more complete mixture of the ingredients.

Yet another object is to provide a novel method of reducing the free acid or phosphatic fertilizer products while concomitantly increasing the fertilizing value.

With these and other equally important objects in view the invention comprehends the process of manufacturing phosphatic fertilizers of the superphosphate and double super type which comprises the formation or generation of separate liquid streams of the said reagent and the phosphatic material, preheated in a novel manner, and the regulation of the velocity of these two streams to cause impingement in a compounding zone in which the proper equivalent amounts of the compound are continuously maintained.

As has been indicated above, numerous disadvantages have attended the older methods of manufacture of phosphatic fertilizers. These older methods were essentially batch processes in which the whole mass of rock was deposited in a single container and then mixed. As a result a considerable amount of globulation ensued. These globules or nodules of dust, in some instances, remained in the unreacted condition throughout the process. Furthermore, due to the mutual affinity of the ingredients, the reaction products were quickly formed and caused solidification or semi-solidification of the mass. This solidification precluded further mixing and hence definite physical limits were placed upon the extent of the mixing period and the dispersion of the compounds.

The present process is characterized by the fact that the receiving stage, which comprises preferably a rotary autoclave, is charged simultaneously with the mixing of the reactive materials. In addition the operation in its initial stages, is carried out in substantially liquid phase, thereby insuring high flexibility in mechanical operations combined with optimum reaction conditions. The present method is also characterized by a continuous mixing of the rock and acid in substantially predetermined constant ratio of the ingredients and under conditions of fine subdivision and rapid motion or turbulence as distinguished from the older processes which were carried out on the batch principle. The invention is further characterized by a novel method of introducing a material which will react with any residual acid agents to salts having fertilizing value.

In its essential features, the present invention comprises the preparation of the water slurry of finely divided dust and the generation of a moving stream of this dust slurry, and the impingement of this stream upon a stream of the liquid reagent. The invention also comprehends the preparation of a slurry of finely divided phosphatic material with aqueous ammonia. The velocity and volume of the phosphatic slurry and reagent are carefully controlled so that at the point of impingement or mixing, termed herein the compounding stage, a predetermined constant ratio of the two ingredients is maintained.

In carrying out the process an apparatus such as that disclosed in the prior application Serial No. 304,789, noted above, or copending application Serial No. 393,826, filed September 19, 1929, may be employed. As shown in those applications, the apparatus comprises an acid tank and dust hopper which are fitted with discharge conduits, each of which communicates with a mixing valve in which the materials are compounded. From the mixing valve the stream of the mixed or compounded mass is discharged at high velocity to a autoclave. In the preferred operation a low pressure is maintained in the autoclave so as to assist the positive pressure on the rock and dust, largely eliminate back pressure and withdraw some of the gases and/or vapors formed in the initial reactions.

The present method differs from the prior methods described in two essential and important features. The first is the preliminary preparation of a slurry of phosphatic material with water or with aqueous ammonia. It will be observed that the provision of an aqueous slurry instead of a mass of solid material is attended with many advantages. The reagent, upon admission to the compounding stage, contacts with a solid which is suspended in an aqueous vehicle. The phosphatic material may be conceived as consisting of a mass of small particles of rock dust, or other phosphatic material, the surface of each of which is wetted with water. The dispersion of the dust in an aqueous medium, particularly when combined with means which provides for increasing the turbulence, insures a rapid dispersion of the acid through the dust. The aqueous vehicle, in effect, presents a substantially continuous phase in a stream of which the solid material provides a discontinuous phase. Insofar as the mixing operation is concerned therefore, the present system is comparable to the ease of mixing one miscible method with another. This not only insures a short mixing period but also provides for substantially homogeneous concentration.

It will also be noted that the described method of compounding presents other advantages. Upon adding acid to the rock slurry a certain amount of heat is generated, due to the heat of dilution of the acid. This heat is applied directly to the discrete particles of the rock, which are covered with the acid solution, and hence provides optimum thermal acceleration of the reaction. When the process is carried out by using a rock slurry of aqueous ammonia, the acid may react with ammonia, exothermically, to form ammonium salts such as ammonium sulphate and ammonium phosphate. These reactions, as noted, generate considerable heat, which heat, being generated in situ, is disseminated throughout the mass.

In carrying out the operation, the acid which is admitted to the compounding stage may be relatively strong. The strength of this acid will, of course, depend upon the ultimate acid strength desired and the quantity of water and/or aqueous ammonia added to the rock. The quantity added, in order to reduce the acid of high concentration or strength to one of lower value, will of course be apparent to those skilled in the art. To obtain any ultimate acid strength, with a given quantity of water or ammonia in a rock slurry, it is only necessary to regulate the initial concentration of the acid and/or volume of this acid admitted per unit of time to the compounding stage. With such a process therefore, the materials are not only mixed in liquid phase but the solid components are first covered, so to speak, with a film of reactive water and this film mixed with a strong acid to utilize the heat of diluation (and the heat of formation of the ammonia salts) in situ to accelerate the decomposition.

As pointed out in the prior applications referred to, the mixing of the materials in the compounding stage may be further improved by providing means to increase the turbulence of the mass. Such means may take the form of a baffle plate, either positioned in the transfer line or in the autoclave adjacent the efflux end of the discharge line, or may include a special form of mixing valve which imparts turbulent motion to the mass passing therethrough. The velocity of the material may be additionally increased by imparting additional force in the direction of flow by means of suitable jets. Through these jets may be forced air, reactive or inert gases and so forth.

From the mixing valve the stream of material is discharged, as noted, into an autoclave. During the charging operation, as explained above, the reverse pressure may be maintained in the autoclave for the purposes described. After the entire mass of material has been charged the autoclave is sealed off from the charging device by operating a suitable valve described and shown in copending application Serial No. 393,791, filed September 19, 1929. The autoclave may be rotated and the mass kept under initial autogenous pressures for a predetermined time. In the average run, the initial pressures are maintained for a period of about twenty minutes. This pressure may range from twenty-five to fifty lbs. per sq. in. or more. During this period the mass is maintained in a plastic state. This we believe is due to the fact that the imposed pressure tends to retard reactivity. This retardation of reactivity tends to prevent the formation of solid products and to largely retain the volatile components.

During this period the mass is continuously agitated by rotating the autoclave, and any tendency to porosity is broken down. This agitation, therefore, provides for a method of continuously resurfacing the mass and bringing the acidifying agent into intimate and close contact with the unavailable phosphate. During the early stages of this digestion period the mass is not only in mixable condition, but it is of eminently dense form.

After the material has been agitated under the initial pressures, the pressure may thereafter be released at intervals. This intermediate release of pressure tends to permit the reactions to proceed with the evolution of some gases and vapors. These gases and vapors percolating upwardly through the mass tend to expand or intumesce the slurry. The constant rotation however redensifies the material and recontacts the reactive surfaces.

After the material has been digested for a time sufficient to permit the substantially complete conversion of the unavailable phosphatic material to available forms, the conditions within the autoclave are so adjusted as to permit crystallization of the mass. To do this the pressure is preferably reduced to atmospheric. The quick drop in pressure effects a proportionate diminution in the temperature which greatly assists in the crystallizing action. This cooling effect may be supplemented by utilizing positive cooling media as explained in copending application Serial No. 166,808, filed Feb. 8, 1927, now Patent No. 1,837,307.

Upon the termination of the crystallization stage the mass is then preferably vacuum cured, as explained in the copending application of D. L. Anderson, Serial No. 393,853, filed Sept. 19, 1929. This treatment essentially consists in drying the mass under vacuum conditions and with a slow recession of temperature. This treatment not only removes water from the material but also effects a decided increase in acidulation. After the curing step the material may be ground and bagged, or if desired may be treated to any provided ammonification process.

As noted above, the invention comprehends two distinct features. The first of these is the novel method of treating phosphatic material which involves the preparation of a water slurry and the utilization of this as a raw material for subsequent reaction with an acid. While this material is particularly useful in the process of autoclaving, it is to be understood that it is not limited to such a process. If desired, the water slurry of rock may be mixed with acid in the charging device as described and then transported to a receiving stage which may comprise a den.

The second novel feature of the invention comprises the treatment of an ammonified water slurry of phosphatic material with an acid and the charging of the mixture either to an autoclave or other type of receiving agent. In operating with an ammonified water slurry, it will be understood that various expedients may be employed to insure and maintain the desired amount of ammonia incorporated in the mixture. When this novel slurry is employed, it is desirable to provide the dust container or hopper with suitable cooling means so as to largely prevent the escape of ammonia in volatile form and thereby govern the concentration of ammonia in the system.

In any and all of the above described processes it will be understood that the final product may be further ammonified if it is desired to increase the available nitrogenous constituents by treatments such as are described in application Serial No. 394,729, filed Aug. 20, 1929.

It will also be appreciated that the ammonia may be incorporated in the rock water slurry in any desired manner. For example the slurry may be made up by mixing finely divided phosphatic material with an aqueous ammonia solution, or the slurry may first be made up by mixing water with rock and then injecting ammonia gas or anhydrous ammonia under controlled temperature conditions.

It will be noted that the improved treatment involving the use of an ammonified slurry subserves a number of distinct advantages. As noted above the heats of dilution of the acid and the heats of formation of the ammonia salts are generated in situ and utilized. In addition to this the present process presents a novel method of regulating the concentration of the acid employed. In manufacturing acid phosphate or double super phosphate a relatively dilute acid must be used in order to provide sufficient excess water for crystallization of the crystallizable reaction products. In addition to this the concentration of the acid is reduced so as to limit or retard the reactivity and provide for the proper mixing of the materials. In the present method, by governing the amounts of water and ammonia the concentration of the acid may be very carefully and closely regulated.

The improvement in respect to ammonia is considered to reside broadly in the concept of introducing ammonia into the product by way of the phosphatic raw material.

While there are described preferred processes for carrying out the present invention, it is to be understood that these are given purely by way of example and are not to be considered restrictive short of the broad principles of the invention as herein described.

We claim:

1. The process of preparing phosphatic fertilizers comprising forming a slurry of finely divided phosphatic material with a predetermined amount of aqueous ammonia, passing a stream of the slurry to a compounding stage and there conjoining it with a separate stream of a mineral acid, the concentration of which is so regulated that by dilution with the said predetermined quantity any desired ultimate concentration is attained and then passing the mixture to a reaction stage.

2. The process of preparing phosphatic fertilizers comprising forming a slurry of finely divided phosphatic material with a predetermined amount of aqueous ammonia, passing a stream of the slurry to a compounding stage and there conjoining it with a separate stream of sulphuric acid, the concentration of which is so regulated that by dilution with the said predetermined quantity any desired ultimate concentration is attained, and then passing the mixture to a reaction stage.

3. The process of preparing phosphatic fertilizers comprising forming a slurry of finely divided phosphatic material with a predetermined amount of aqueous ammonia, passing a stream of the slurry to a compounding stage and there conjoining it with a separate stream of phosphoric acid, the concentration of which is so regulated that by dilution with the said predetermined quantity any desired ultimate concentration is attained, and then passing the mixture to a reaction stage.

4. The process of preparing phosphatic fertilizers comprising forming a slurry of finely divided phosphatic material with a predetermined amount of aqueous ammonia, passing a stream of the slurry to a compounding stage and there conjoining it with a separate stream of a mineral acid, the concentration of which is so regulated that by dilution with the said predetermined quantity any desired ultimate concentration is attained, and then passing the mixture to an autoclave wherein the mixture is digested under superatmospheric pressure and temperature.

5. The process of preparing phosphatic fertilizers comprising forming a slurry of finely divided phosphatic material with a predetermined amount of aqueous ammonia, passing a stream of the slurry to a compounding stage and there conjoining it with a separate stream of sulphuric acid, the concentration of which is so regulated that by dilution with the said predetermined quantity any desired ultimate concentration is attained, and then passing the mixture to an autoclave wherein the mixture is digested under superatmospheric pressure and temperature.

6. The process of preparing phosphatic fertilizers comprising forming a slurry of finely divided phosphatic material with a predetermined amount of aqueous ammonia, passing a stream of the slurry to a compounding stage and there conjoining it with a separate stream of phosphoric acid, the concentration of which is so regulated that by dilution with the said predetermined quantity any desired ultimate concentration is attained, and then passing the mixture to an autoclave wherein the mixture is digested under superatmospheric pressure and temperature.

In testimony whereof we affix our signatures.

BEVERLY OBER.
EDWARD HYATT WIGHT.